United States Patent [19]
Rowe

[11] Patent Number: 5,158,327
[45] Date of Patent: Oct. 27, 1992

[54] HYDRAULIC HOSE COUPLING HANDLE AND METHOD OF MAKING SAME

[76] Inventor: Neil Rowe, 2222 E Avenue, Garwin, Iowa 50632

[21] Appl. No.: 774,868

[22] Filed: Oct. 11, 1991

[51] Int. Cl.$^5$ ............................................. F16L 37/02
[52] U.S. Cl. ...................................... 285/38; 285/45; 29/428
[58] Field of Search .......................... 285/316, 45, 38; 29/428

[56] References Cited

U.S. PATENT DOCUMENTS

| | | | |
|---|---|---|---|
| 3,097,865 | 7/1963 | Zeeb et al. | 285/45 X |
| 3,413,017 | 11/1968 | Hughey | 285/38 |
| 5,058,928 | 10/1991 | Watson | 285/38 |

Primary Examiner—Dave W. Arola
Attorney, Agent, or Firm—Zarley, McKee, Thomte, Voorhees & Sease

[57] ABSTRACT

A handle is inserted between the male end coupler and the end connector on a conventional hydraulic hose. The handle has a solid rigid core with a passageway therethrough which connects to the hose end connector and the male end coupler. The core which substantially enlarges the effective diameter of the handle is embraced by a flexible sleeve of molded PVC and provides a holding station for the operator's hand between front and rear annular shoulders that keeps a hand from slipping off the handle and protects the handle from splattering oil from the hydraulic pump.

5 Claims, 1 Drawing Sheet

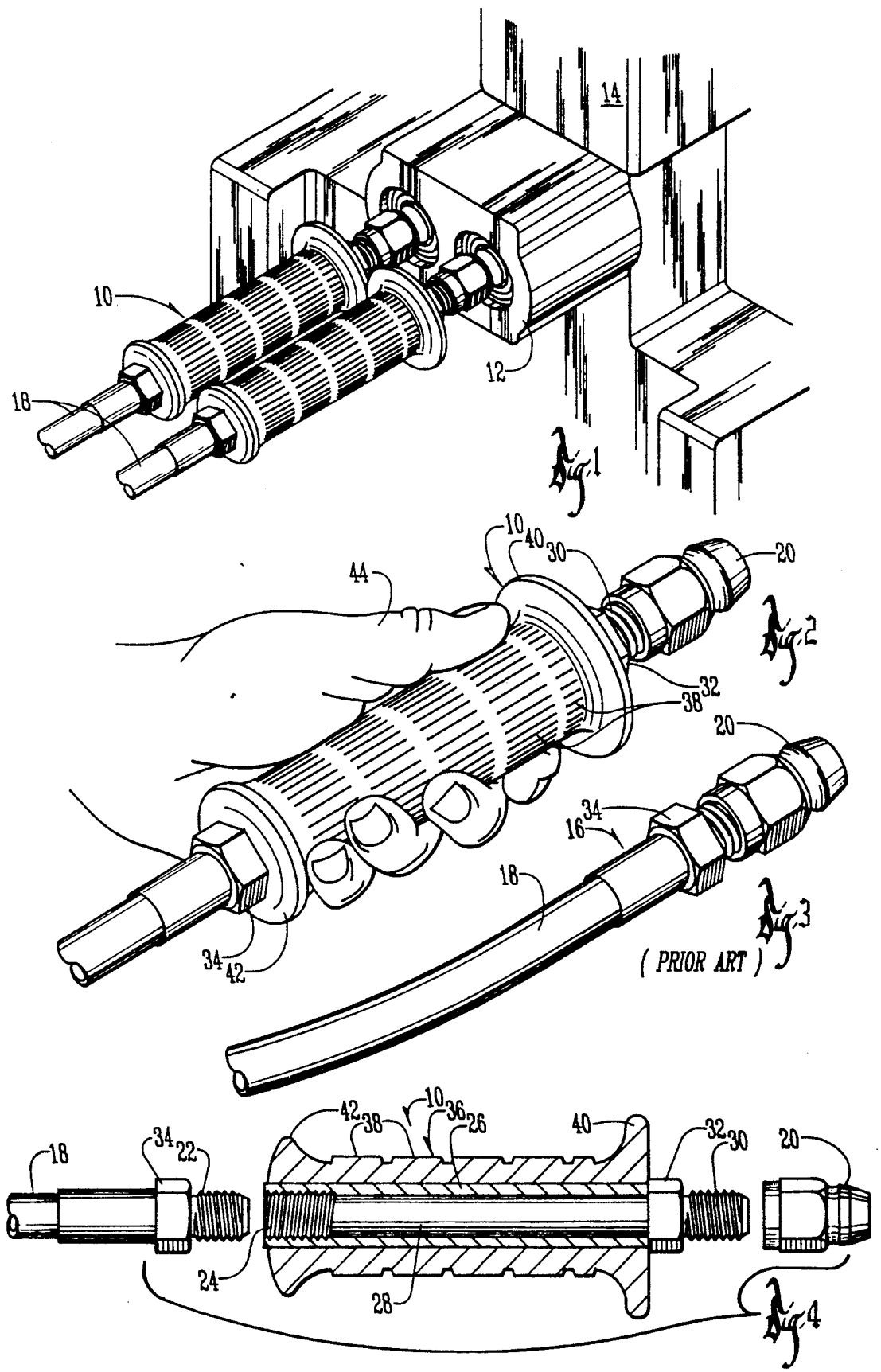

HYDRAULIC HOSE COUPLING HANDLE AND METHOD OF MAKING SAME

BACKGROUND OF THE INVENTION

The connecting and disconnecting of a hydraulic hose to the pump on the rear of the tractor requires the operator to grasp the flexible hose. A solid hold on the hose is not possible as the hose is small in diameter and flexible. Considerable pressure on the hose is required to snap it into engagement with the pump. A certain amount of oil leakage occurs which is spread over the hose adjacent the end making the hose slippery. The hose also becomes dirty through accumulation of oil and dust.

SUMMARY OF THE INVENTION

The hydraulic hose handle of this invention includes an enlarged in diameter rigid core pipe covered With flexible molded PVC to provide comfort to the user's hand. The handle is inserted between the conventional male end coupler and the hose end connector. The handle is large enough to accommodate the operator's hand and being rigid allows for pressure to be readily applied to the male end coupler to snap it into engagement with the female coupler in the hydraulic pump on the rear end of the tractor. An annular shoulder extends around the forward end of the handle to function as a stop for the hand and to protect the hand from any oil that might splatter during coupling and uncoupling.

The handles may be color coded to assist in correctly connecting them to the ports on the hydraulic pump.

DESCRIPTION OF THE DRAWINGS

FIG. 1 is a fragmentary perspective view of the hydraulic hose coupling handle being connected to the hydraulic pump on the rear end of a tractor.

FIG. 2 is a fragmentary perspective view of the hydraulic hose coupling handle being held in a person's hand.

FIG. 3 is a fragmentary perspective view of the conventional hydraulic hose having a male end coupler.

FIG. 4 is an exploded side elevational view of the hydraulic hose coupling handle.

DESCRIPTION OF PREFERRED EMBODIMENT

The hydraulic hose coupling handle of this invention is referred to generally in FIG. 2 by the reference numeral 10 and is shown in FIG. 1 connected to the hydraulic pump 12 on a tractor 14.

A conventional hydraulic hose 16 is shown in FIG. 3 which includes flexible tubing 18 with a male end coupler 20 adapted to be inserted into the female coupler in the hydraulic pump 12. It is seen that there is little substance for the operator to hold onto when grasping the hose 16 for inserting into the female coupler of the pump 12.

In contrast to the conventional hydraulic hose 16, the handle 10 of this invention has been inserted between the male end coupler 20 and the hose 18. The hose 18 includes an end connector 22 which is screwed into a threaded opening 24 in a rigid core 26 having a passageway 28 therethrough. The core 26 includes a threaded male end 30 which is threaded into the coupler 20. The core 26 is held against rotation by a wrench (not shown) being applied to a nut 32 integrally formed on the core 26. Similarly, a nut 34 is provided on the end connector 22 of the hose 18.

The handle 10 also includes a flexible molded PVC sleeve 36 embracing the core 26 which further enlarges the handle in diameter to provide a rigid hand hold for operating the hose 16 and connecting it to the pump 12. The flexible sleeve includes a plurality of fins 38 to enhance its ability to be held in the hand without slipping. It is also seen that front and rear annular shoulders 40 and 42 are provided which assure that the operator's hand 44 does not slip off the handle 10. The front annular shoulder 40 also protects the handle 10 from oil that might otherwise splatter onto it when the hose is connected and disconnected from the pump 12. The sleeve 36 is slid onto the core 26.

Thus it is seen that a difficult and messy task of connecting hydraulic hoses to the hydraulic pump on a tractor has been made quick, clean and easy through the addition of a rigid handle covered with flexible material making the handle substantially larger in diameter than the hose and substantially rigid when being manipulated to connect and disconnect the hose to the hydraulic pump on the tractor. The hand cannot slip off the handle by virtue of the front and rear annular shoulders and the friction increasing means having been provided in the form of the fins on the flexible sleeve embracing the rigid center core.

What is claimed is:

1. A hydraulic hose coupling with handle comprising,
    a free standing flexible hydraulic hose having a threaded end connector,
    a coupled having a threaded one end and the opposite end adapted to be removable connected to a hydraulic pump, and
    a handle including a one piece rigid straight core having a threaded opening at one end and having a passageway of uniform cross section extending from said threaded opening to the opposite end thereof, said opposite end being threaded and threadably connected to said threaded one end of said coupler, said end connector being threadably received in said threaded opening, said handle being substantially rigid and substantially larger in diameter than said hydraulic hose end connector and said coupler and having sufficient length to accommodate a person's hand for connecting and disconnecting said coupler to said hydraulic pump.

2. The structure of claim 1 wherein said opposite end of said coupler is adapted to snap into and out of engagement with said hydraulic pump.

3. The structure of claim 1 wherein said handle rigid core is substantially embraced by a flexible grip.

4. The structure of claim 3 wherein said grip includes an annular shoulder at said one end for engagement by a person's hand to function as a stop to limit movement of said hand off of said handle.

5. The method of making a hydraulic hose coupling with handle comprising the steps of,
    providing a free standing flexible hydraulic hose with a threaded end connector threadably connected to a threaded coupler adapted to be removably connected to a hydraulic pump,
    disconnecting said hydraulic hose end connector from said coupler,
    providing a handle including a one piece rigid straight core having a threaded opening at one end and having a passageway of uniform cross section extending from said threaded opening at one end to the opposite threaded end and said handle being substantially rigid and substantially larger in diameter than said hydraulic hose, end connector and said coupler and having sufficient length to accommodate a person's hand, and
    connecting threadably said handle between said hydraulic hose end connector and said coupler.

* * * * *